(12) United States Patent  
Mattheis et al.

(10) Patent No.: US 9,176,716 B2  
(45) Date of Patent: Nov. 3, 2015

(54) METHOD AND APPARATUS FOR EXPLOITING DATA LOCALITY IN DYNAMIC TASK SCHEDULING

(71) Applicant: Siemens Aktiengesellschaft, Munich (DE)

(72) Inventors: Sebastian Mattheis, Burgel (DE); Tobias Schule, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 384 days.

(21) Appl. No.: 13/865,856

(22) Filed: Apr. 18, 2013

(65) Prior Publication Data

US 2014/0317636 A1 Oct. 23, 2014

(51) Int. Cl.
- G06F 9/45 (2006.01)
- G06F 9/46 (2006.01)
- G06F 9/48 (2006.01)
- G06F 9/50 (2006.01)

(52) U.S. Cl.
CPC *G06F 8/451* (2013.01); *G06F 8/41* (2013.01); *G06F 8/423* (2013.01); *G06F 8/43* (2013.01); *G06F 8/445* (2013.01); *G06F 8/4441* (2013.01); *G06F 8/452* (2013.01); *G06F 9/46* (2013.01); *G06F 9/4881* (2013.01); *G06F 9/5033* (2013.01)

(58) Field of Classification Search
None
See application file for complete search history.

(56) References Cited

U.S. PATENT DOCUMENTS

| 8,667,474 B2* | 3/2014 | Radigan | 717/136 |
| 2007/0028222 A1 | 2/2007 | Meijer et al. | 717/140 |
| 2007/0143759 A1* | 6/2007 | Ozgur et al. | 718/102 |
| 2009/0328047 A1 | 12/2009 | Li et al. | 718/102 |
| 2013/0191843 A1* | 7/2013 | Sarkar et al. | 718/105 |

FOREIGN PATENT DOCUMENTS

JP 2004252728 A 9/2004 ............... G06F 9/45

OTHER PUBLICATIONS

Stephen Smith, "An Expression Template aware Lambda Function", 2000, Proceddings of 2000 Workshop on C++ Template Programming.*
Blumofe, Robert D. et al., "Cilk: An Efficient Multithreaded Runtime System," Symposium on Principles and Practice of Parallel Programming, ACM, 11 pages, Jul. 19, 1995.
"Threading Building Blocks (Intel TBB)," Internet Resource: pages, Retrieved Apr. 8, 2013.

* cited by examiner

*Primary Examiner* — Lewis A Bullock, Jr.
*Assistant Examiner* — Mark Gooray
(74) *Attorney, Agent, or Firm* — Slayden Grubert Beard PLLC

(57) ABSTRACT

A method for scheduling tasks to processor cores of a parallel computing system may include the steps of processing a source code which comprises at least one parallel lambda function having a function body called by a task and having a capture list specifying the data structures accessed in the function body of said parallel lambda function and used to derive data location information; executing the task calling said function body on the processor core which is associated to a memory unit of the parallel computing system where the data of the data structures specified by said capture list is stored, wherein the memory unit is selected or localized based on the derived data location information.

15 Claims, 3 Drawing Sheets

METHOD AND APPARATUS FOR EXPLOITING DATA LOCALITY IN DYNAMIC TASK SCHEDULING

TECHNICAL FIELD

The disclosure relates to a method and apparatus for scheduling of tasks in a parallel computing system having several processors each comprising at least one processor core.

BACKGROUND

Scheduling is the act of time-sharing resources between multiple resource requesters. In a computer system, tasks are scheduled to utilize processing time on available computing resources. Scheduling can be driven by various decision-making constraints. For example, tasks have to be scheduled to meet certain deadlines or have to use processing resources efficiently to increase the throughput. The emergence of parallel computing systems introduces additional challenges in scheduling. In a uniprocessor system, scheduling comprises the sequencing of tasks to utilize a single processor whereas in a multiprocessor system, tasks have to be distributed to multiple processors to speed up the execution of the program. However, in a parallel computer system, the processors can have non-uniform memory access times. As a consequence, the execution time of a task can depend on the utilized processor and its memory access time to the data used by the task. For instance, the memory access times can be higher, if the execution of a task is mapped to a processor which is located remote to the used data, as if mapped to a processor that is nearby to the used data. By means of a scheduler, the tasks are distributed to different processor cores of processors at runtime. To achieve a high performance, tasks may be executed on processor cores which have already the necessary corresponding data used by the task in their respective cache memory. Otherwise, the used data has first to be loaded which takes additional time. This is particularly relevant in a multiprocessor system with distributed memory, e.g. a non-uniform memory access system (NUMA). In such a system, the data has to be loaded under certain circumstances via a communication network from a remote memory which can lead to a significant reduction of performance of the respective system. A conventional way to avoid such performance losses is to use heuristics in the scheduler, which for instance make sure that child tasks are executed on the same processor cores as the respective parent tasks, as described for instance in Robert D. Blumofe, Christopher F. Joerg, Bradley C. Kuszmaul, Charles E. Leiserson, Keith H. Randall, and Yuli Zhou "An Efficient Multithreaded Runtime System", Symposium on Principles and Practice of Parallel Programming (PPOPP), ACM, 1995. However, these kinds of heuristics fail for instance, when the same data is accessed several times by sequential loops. The reason for that is that these heuristics do not have any information about the location of the data in the cache memories or in the main memory of the computer system. To overcome this problem, some libraries offer mechanisms which consider the data location for simple loops and use this information for scheduling. An example for such a concept is "affinity partitioners" used in Threading Building Blocks, which is a library of Intel for parallel programming in C++, as described under http://threadingbuildingblocks.org. However, these kinds of mechanisms can for instance not be used for recursive calculations or algorithms.

Another conventional approach is to use in the source code of the application explicitly data location information that influences the scheduling. For this, the software developer has to indicate where specific data is read or changed. Obviously, a significant disadvantage of this conventional approach is that the developer has to encode the necessary operations within the source code. This increases the complexity of the source code and makes it more difficult to maintain the developed software code.

Accordingly, there is a need for a method and apparatus for scheduling of tasks of a parallel computing system with several processor cores to increase the performance or throughput of the computing system without increasing the complexity of the source code.

SUMMARY

One embodiment provides a method for scheduling tasks to processor cores of a parallel computing system, the method comprising: (a) processing a source code which comprises at least one parallel lambda function having a function body called by a task and having a capture list specifying the data structures accessed in the function body of said parallel lambda function and used to derive data location information; and (b) executing the task calling said function body on the processor core which is associated to a memory unit of the parallel computing system where the data of the data structures specified by said capture list is stored, wherein the memory unit is selected or localized based on the derived data location information.

In a further embodiment, the capture list of the parallel lambda function indicates external data structures which are used by the function body of said lambda function.

In a further embodiment, the parallel lambda function comprises besides the capture list and the function body a parameter list.

In a further embodiment, the processing of the source code is performed by a compiler unit which generates code to derive the data location information from the capture list and the parameter list of the parallel lambda function whose function body is called by said task.

In a further embodiment, the data location information derived by the code generated by said compiler unit indicates a storage location of the data stored in the specified data structures.

In a further embodiment, the parallel lambda function is used by a library function of the parallel computing system.

In a further embodiment, upon processing of the source code by the compiler unit a localize operation is automatically inserted, wherein the localize operation localizes the storage location of the data stored in the data structures which are specified in the capture list of said parallel lambda function.

In a further embodiment, upon processing of said source code the localize operation is inserted into the argument list of the library function.

In a further embodiment, the localize operation determines as the storage location the memory unit of said parallel computing system which is associated to the last processor core which had access to the data of the specified data structures.

In a further embodiment, upon processing of said source code by said compiler unit an update operation is automatically inserted in said parallel lambda function which updates the stored data location information with respect to the storage location of the data stored in said specified data structures.

In a further embodiment, upon processing of said source code the update operation is inserted into the function body of said lambda function.

In a further embodiment, the update operation stores the number of the last processor core which had access to the data of the specified data structures in a management list or management table to which the localize operation has access.

Another embodiment provides an apparatus for scheduling of tasks to processor cores of a parallel computing system comprising a compiler unit which processes automatically a source code which comprises at least one parallel lambda function having a function body called by a task and having a capture list specifying the data structures accessed in the function body of said parallel lambda function and used to derive data location information, wherein the calling task is executed on the processor core associated to a memory unit which is selected based on the derived data location information and which stores the data of the data structures specified in said capture list of said parallel lambda function.

In a further embodiment, the memory unit comprises a cache memory of a processor within said parallel computing system comprising at least one processor core.

Another embodiment provides a computing system comprising an apparatus as disclosed above, several processors each having at least one processor core and distributed memory units each being associated to a corresponding processor core.

BRIEF DESCRIPTION OF THE DRAWINGS

Exemplary embodiments will be explained in more detail below based on the schematic drawings, wherein.

DETAILED DESCRIPTION

Figure 1:
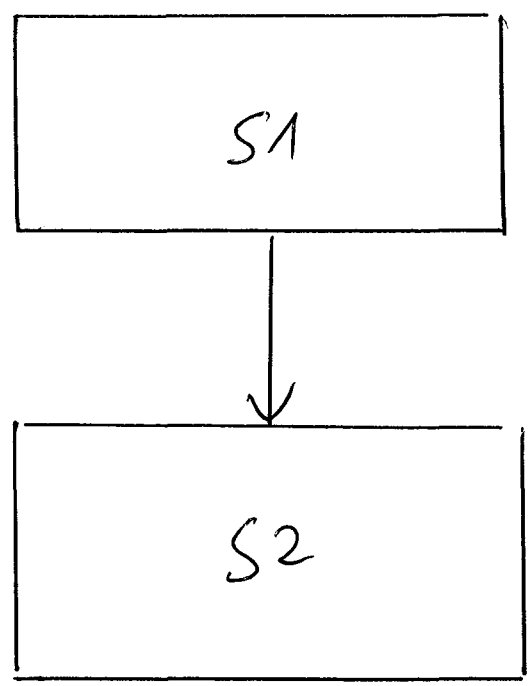
FIG. 1 shows a flow chart of an example embodiment of a method for scheduling of tasks in a parallel computing system.

Some embodiments provide a method for scheduling tasks to processor cores of a parallel computing system comprising the steps of:
processing a source code which comprises at least one parallel lambda function having a function body called by a task and having a capture list specifying the data structures accessed in the function body and used to derive data location information; and
executing the task calling said function body on the processor core which is associated to a memory unit of the parallel computing system where the data of the data structures specified by said capture list is stored, wherein the memory unit is selected or localized based on the derived data location information.

In one embodiment of the disclosed method, the capture list of the parallel lambda function indicates external data structures which are used in the function body of the parallel lambda function.

In a further embodiment of the disclosed method, the parallel lambda function comprises besides the capture list and the function body a parameter list.

In a further embodiment of the disclosed method, the processing of the source code is performed by a compiler unit which generates automatically code to derive data location information based on the capture list and the parameter list of the parallel lambda function whose function body is called by said task.

In a further embodiment of the disclosed method, the data location information derived by the code generated by said compiler unit indicates a storage location of the data stored in the specified data structures.

In a further embodiment of the disclosed method, the parallel lambda function is used by a library function to create a task, wherein the library function is read from a function library of said computing system.

In a further embodiment of the disclosed method, during processing of the source code by the compiler unit a localize operation is inserted automatically, wherein the localize operation localizes data which is stored in the data structures which are specified by the capture list of the parallel lambda function.

In a further embodiment of the disclosed method, during processing of the source code, the localize operation is inserted into the argument list of the library function that creates a task executing the function body.

In a further embodiment of the disclosed method, the localize operation localizes as the storage location the memory unit of the parallel computing system which is associated to the last processor core which had access to the data of the specified data structures.

In a further embodiment of the disclosed method, during processing of the source code by the compiler unit an update operation is automatically inserted which updates the stored data location information with respect to the storage location of the stored data of the specified data structures.

In a further embodiment of the disclosed method, during processing of the source code the update operation is inserted into the function body of the parallel lambda function.

In a further embodiment of the disclosed method, the update operation stores the number of the last processor core which had access to the data of the specified data structures in a management list or management table used by the localize operation.

Other embodiments provide an apparatus for scheduling of tasks to processor cores of a parallel computing system is provided comprising a compiler unit which processes a source code comprising at least one parallel lambda function having a function body called by a task and which accesses data structures specified by a capture list of said parallel lambda function to derive data location information, wherein the calling task is executed on the processor core which is associated to a memory unit of the parallel computing system which stores the data of the data structures specified in said capture list of said parallel lambda function, wherein the memory unit is selected or localized based on the derived data location information.

In one embodiment of the disclosed apparatus, the memory unit is a cache memory of a processor of said parallel computing system which comprises several processor cores.

Other embodiments provide a computing system is provided which comprises a scheduling apparatus as disclosed herein and which comprises several processors each having at least one processor core and distributed memory units each being associated to a corresponding processor.

As can be seen in FIG. 1, in an example implementation of the method for scheduling tasks to processor cores of a parallel computing system there are two main steps. In a first step S1, a source code is loaded and processed, for instance by a compiler unit of the computer system. The loaded source code comprises at least one parallel lambda function which has a function body. The lambda function is an anonymous function. The lambda function or anonymous function is a function or a subroutine which is defined and possibly called without being bound to an identifier. Anonymous functions are used to pass an argument to a higher-order function. In some programming languages, anonymous functions are identified by using the keyword lambda so that anonymous functions can be referred to as lambda functions. Anonymous functions are mostly used to contain functionality that does not need to be named. There are many programming languages which support anonymous functions, for instance C++ since the standard from 2011 called C++11. C++11 provides anonymous functions, however, no parallel lambda functions. The parallel lambda expression as used by the disclosed method has the syntax form:

[[capture list]] (parameters) {body}

The lambda function refers to identifiers declared outside the lambda function. A set of these variables is commonly called a closure. Closures are defined between the square brackets of the lambda function in the declaration of the lambda expression. The mechanism allows these variables to be captured by value or by reference. The capture list indicates which variables or objects declared outside the lambda function are visible inside the lambda function. The parameter list in round brackets specifies parameters and the third part of the lambda function indicates the function body of the lambda function. The body of a parallel lambda function can be called by a task and can access data structures which are specified in the capture list of the parallel lambda function. The processing of the source code is performed to derive automatically data location information of the data of the specified data structures. The data structures can comprise several dimensions. A data structure can be for instance a data array or a data matrix. Further, the data structures can be user-defined data structures or user-defined data objects.

After having generated code for deriving the data location information in step S1, the task calling the function body is assigned to and executed on a processor core of the parallel computing system which is associated to the memory unit of the parallel computing system which does store the data of the data structures specified in the capture list of the parallel lambda function. The memory unit is determined based on the derived data location information. The capture list of the parallel lambda function forming part of the source code indicates external data structures which are used in the function body of the parallel lambda function. In one embodiment, the processing of the source code is performed by a compiler unit. The compiler unit generates code which derives from the capture list and the parameter list of the parallel lambda function, whose function body is called by the task, automatically the data location information. The derived data location information indicates the storage location of the data of the specified data structures. It is possible that the parallel lambda function of the source code is activated or invoked by a library function, wherein the library function can be read from a library of the parallel computing system. An example for such a library function is the so-called spawn function.

In one embodiment of the disclosed method, during processing of the source code by the compiler unit a localize operation "localize" is inserted automatically. This localize operation determines or specifies the storage location of those data which is stored in the data structures which have been specified in the capture list of the parallel lambda function. The compiler unit when processing the source code does in one implementation insert automatically this localize operation in the argument list of a library function, for instance into the argument list of a spawn function. In one implementation, the inserted localize operation determines as the storage location the memory unit of the parallel computing system which is assigned to the processor core which has been the last processor core to access the data of the specified data structures, for instance the specified data array.

In one embodiment, the localize operation acquires information by reading the content of a locality vector. The locality vector can be an array that records locality information for blocks of data. Each entry in the locality vector can represent a certain data block. The content of the array points to a processor indicating in one implementation that the corresponding data is located in the processor's cache.

In a further embodiment, the compiler unit when processing the source code does further insert automatically an update operation "update" in the parallel lambda function which forms part of the source code. This update operation updates the stored data location information with respect to the storage location of the stored data of the specified data structures. In one implementation during processing of the source code, the compiler unit inserts automatically the update operation in the function body of the parallel lambda function. In one embodiment, the update operation stores the number or identifier of the processor core which has been the last processor core which had access to the data of the specified data structures in a management list or management table which can be used by the localize operation.

Figure 2:
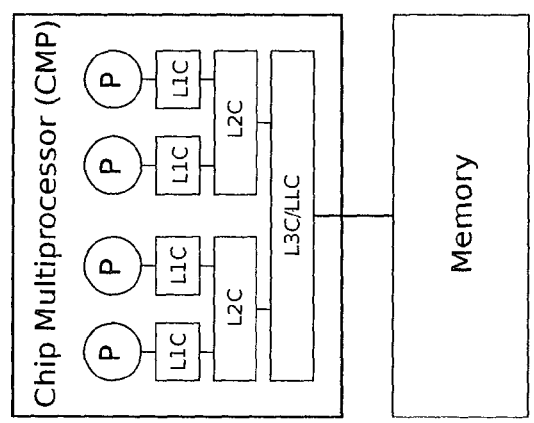
FIG. 2 shows a diagram of a multi-core processor within a parallel computing system for illustrating the operation of an example embodiment of the disclosed method and apparatus.

FIG. 2 shows a block diagram of an example embodiment of a multiprocessor having several processor cores P. In the exemplary embodiment shown in FIG. 2, the multiprocessor comprises two levels of cache memories which can be placed on a chip. A first level cache L1C can be private, whereas a second level cache L2C and a last level cache LLC can be shared among multiple processor cores. The cache memories can be used transparently which means that a program can access data as it would reside in the main memory only. In the shown example of FIG. 2, the multi-processor comprises four processor cores P. To each processor core, a corresponding memory unit can be associated or assigned. This memory unit can be for instance formed by one of the cache memories integrated on the same chip as the processor core.

Figure 3:
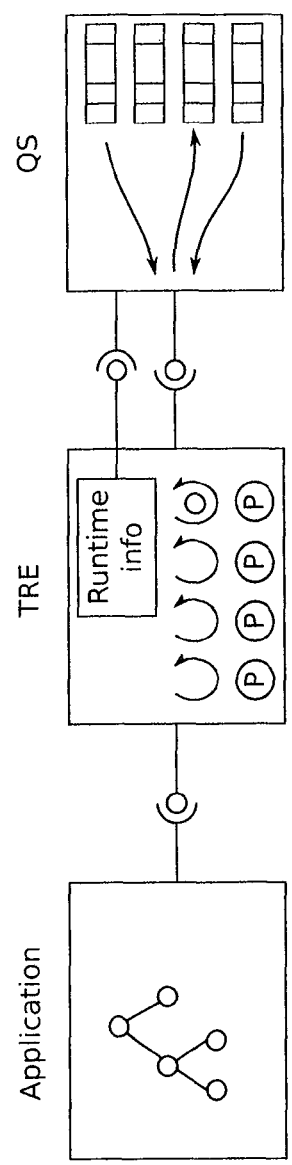
FIG. 3 shows a diagram for illustrating a scheduling mechanism for illustrating the operation of an example embodiment of the disclosed method and apparatus.

FIG. 3 illustrates a scheduling in a parallel computing system. The scheduling of dynamic multi-tasking computations requires scheduling steps including processor mapping and execution ordering. Besides the mechanism to map the tasks to processors and to determine the execution order, a scheduler implementation requires a mechanism for resource allocation. A runtime environment is provided to allocate resources such as processors and data structures and to provide a task interface. A parallel task runtime environment can be provided for parallel execution of dynamic multi-tasking computations.

A task runtime environment TRE can be provided to manage the necessary resources, i.e. processor allocation, thread management and memory allocation for the execution of a multi-tasking application. For that purpose, the task runtime environment TRE can create as many worker threads as processors can be used and pins each worker thread to exactly one processor. Each worker thread can perform an execution loop that continuously fetches and executes tasks in each iteration. The task runtime environment TRE can provide a task-based interface, for instance with a spawn and a sync operation.

A dynamic multi-tasking application can be provided on top of the task runtime environment TRE having a task-based interface. The spawn and sync operations allow dynamic task creation and synchronization.

Further, an underlying queuing system QS as illustrated in FIG. 3 can provide an interface to the task runtime environment TRE with an enqueue and dequeue operation to store and fetch tasks for execution. Internally, the queuing system QS can implement in one embodiment a scheduling mechanism and data structures to store and schedule tasks. The queuing system QS is capable to obtain runtime information of the task runtime environment to acquire scheduling information, e.g. the number of working threads.

In the following, the operation of an example implementation of the method for scheduling tasks to processor cores of a parallel computing system is described by a simple example of a quicksort algorithm. A conventional quicksort algorithm which sorts recursively an array can be expressed as follows:

```
void quicksort (int array[ ], int left, int right) {
    if (left < right) {
        int pivot = partition (array, left, right);
        spawn ([array, left, pivot] ( ) {quicksort (array, left, pivot);});
        spawn ([array, pivot, right] ( ) {quicksort (array, pivot+1, right);});
        sync ( );
    }
}
```

The library function spawn takes the lambda function as an argument and generates a new task. After having generated the task, the library function executes the generated task parallel to the current task. The function sync waits until all generated child tasks have been finished. By means of the scheduler, the tasks are distributed during runtime to the different processor cores.

The conventional source code of a quicksort algorithm is modified by the use of a parallel lambda function instead of a conventional lambda function. Accordingly, the quicksort algorithm as shown above is implemented using parallel lambda functions as illustrated below:

```
void quicksort (int array [ ], int left, int right) {
    if (left < right) {
        int pivot = partition (array, left, right);
        spawn ( [ [array [left:pivot], left, pivot] ] ( ) {
            quicksort (array, left, pivot);
        });
        spawn ( [ [array [pivot+1:right], pivot, right] ] ( ) {
            quicksort (array, pivot+1, right);
        });
        sync ( );
    }
}
```

In the illustrated source code, the source code comprises two times the library function spawn and both library functions take a parallel lambda function as argument, where the capture list is specified within two square brackets. An expression of the form x[i:j] indicates that the body of the lambda function only accesses the array x within the interval ranging from element i to element j.

A call of the library function with a parallel lambda function as an argument of said library function
spawn ([[x[i:j], . . . ]] {body})
corresponds to the following fragment and can be transformed accordingly by the compiler unit:

```
spawn (localize (x, i, j), [x, ...] ( ) {
    body;
    update (x, i, j);
}}
```

As can be seen, the compiler unit automatically inserts a localize operation and an update operation. The localize operation indicates the storage location of those data which is stored in the data structures specified in the capture list of the parallel lambda function. As can be seen, the localize operation is inserted automatically into the argument list of the library function "spawn". The inserted localize operation determines the storage location of the memory unit which is associated to the processor core which has been the last processor core which had access to the data of the specified data structures.

Moreover, the compiler unit inserts automatically during the processing of the source code an update operation into the parallel lambda function of the source code. The update operation updates the data location information with respect to the storage location of the data of the specified data structures. As can be seen, the update operation is inserted automatically into the function body of the parallel lambda function. In one embodiment, the update operation stores the number of the processor core which has been the last processor core having access to the data of the data structures in a management list or management table which can be used by the localize operation.

The mechanism shown above can be used in an analog way for data structures having several data dimensions such as data matrices. It is also possible to use user-defined objects in the capture list of the parallel lambda function instead of data arrays. In one implementation, the functions "localize" and "update" are implemented as methods of a class. This means for instance for one-dimensional data structures that the class has to implement the following interface:

```
interface Localizable {
    localize (i, j);
    update (i, j);
};
```

The result of the above call can be for instance:

```
spawn (x. localize (i, j), [x, . . .] ( ) {
    body;
    x. update (i, j);
}}
```

The same is true for high-dimensional user-defined data structures.

The parallel lambda functions can be used for instance in recursive algorithms as illustrated above. The parallel lambda function can be used for other algorithms as well, for instance for parallel loops or pipeline processing.

With the disclosed method, data location information during execution of parallel programs or tasks is derived and utilized automatically. The parallel lambda functions used in the source code allow the compiler unit to generate code that automatically extracts information about data location and memory accesses. In one embodiment, the capture lists can be extended to specify relevant regions within regular data structures such as arrays by means of intervals. Further, it is possible to use predefined interfaces for user-defined data structures. With the disclosed method, it is possible to automatically insert function and method calls to obtain the required data location information or to update them.

With the method and disclosed apparatus, the complexity of the required source code is reduced significantly so that the system is less prone to failures. Moreover, it is simpler to read and maintain the used source code because of the reduced complexity of the source code. Further, the disclosed method can be used for any parallel computation of different types such as loops, fork-join, divide-and-conquer etc. By supporting user-defined data structures the flexibility of the method and apparatus is still increased. By using the method and disclosed apparatus, the performance of the computing system is increased significantly because of the use of the data location information.

What is claimed is:

1. A method for scheduling tasks to processor cores of a parallel computing system, the method comprising:
   (a) processing a source code, by a compiler unit, that comprises at least one parallel lambda function containing a function body called by a task, a capture list specifying data structures accessed by the function body of said parallel lambda function, and a parameter list, that are used to derive data location information,
   wherein the data structures of the capture list indicate which variables or objects declared outside the lambda function are visible inside the lambda function and the processing of the source code causes the compiler unit to automatically generate code to derive the data location information from the capture list and the parameter list of the parallel lambda function whose function body is called by said task;
   (b) executing in parallel the task calling said function body on the processor core associated with a memory unit of the parallel computing system and the generated code to derive the data location information from the capture and parameter list, wherein the memory unit is selected or localized based on the derived data location information determined from the generated code.

2. The method of claim 1, wherein the data location information derived by the code generated by said compiler unit indicates a storage location of the data stored in the specified data structures.

3. The method of claim 1, wherein the parallel lambda function is used by a library function of the parallel computing system.

4. The method of claim 1, wherein upon processing of the source code by a compiler unit a localize operation is automatically inserted, wherein the localize operation localizes the storage location of the data stored in the data structures which are specified in the capture list of said parallel lambda function.

5. The method of claim 4, wherein upon processing of said source code the localize operation is inserted into the argument list of the library function.

6. The method of claim 4, wherein the localize operation determines as the storage location the memory unit of said parallel computing system associated with the last processor core which had access to the data of the specified data structures.

7. The method of claim 1, wherein upon processing of said source code by a compiler unit an update operation is automatically inserted in said parallel lambda function which updates the stored data location information with respect to the storage location of the data stored in said specified data structures.

8. The method of claim 7, wherein upon processing of said source code the update operation is inserted into the function body of said lambda function.

9. The method of claim 7, wherein the update operation stores the number of the last processor core that had access to the data of the specified data structures in a management list or management table to which the localize operation has access.

10. An apparatus for scheduling of tasks to processor cores of a parallel computing system comprising:
    a compiler unit configured to automatically process a source code comprising at least one parallel lambda function having a function body called by a task and having a capture list specifying data structures accessed in the function body of said parallel lambda function and used to derive data location information, wherein the data structures of the capture list indicate which variables or objects declared outside the lambda function are visible inside the lambda function and the processing of the source code causes the compiler unit to automatically generate code to derive the data location information from the capture list and the parameter list of the parallel lambda function whose function body is called by said task; and
    a processor core configured to execute in parallel the calling task, wherein the processor core is associated with a memory unit of the parallel computing system and the generated code to derive the data location information from the capture and parameter list, wherein the memory unit is selected based on the derived data location information determined from the generated code.

11. The apparatus of claim 10, wherein the memory unit comprises a cache memory of a processor within said parallel computing system comprising at least one processor core.

12. The apparatus of claim 10, wherein the data location information derived by the code generated by said compiler unit indicates a storage location of the data stored in the specified data structures.

13. The apparatus of claim 10, wherein the parallel lambda function is used by a library function of the parallel computing system.

14. The apparatus of claim 10, wherein upon processing of the source code, the compiler unit is configured to automatically perform a localize operation that localizes the storage location of the data stored in the data structures which are specified in the capture list of said parallel lambda function.

15. A computing system comprising:
    several processors each having at least one processor core and distributed memory units each being associated with a corresponding processor core, and
    an apparatus for scheduling of tasks to processor cores of a parallel computing system, the apparatus comprising:
        a compiler unit configured to automatically process a source code comprising at least one parallel lambda function containing a function body called by a task, a capture list specifying data structures accessed by the function body of said parallel lambda function, and a parameter list, that are used to derive data location information, wherein the data structures of the capture list indicate which variables or objects declared outside the lambda function are visible inside the lambda function and the processing of the source code causes the compiler unit to automatically generate code to derive the data location information from the capture list and the parameter list of the parallel lambda function whose function body is called by said task; and
        a processor core of one of the several processors being configured to execute in parallel the calling task, wherein the processor core is associated with one of the distributed memory units of the parallel computing system and the generated code to derive the data location information from the capture and parameter list, wherein the memory unit is selected based on the derived data location information determined from the generated code.

* * * * *